(12) United States Patent
Mao et al.

(10) Patent No.: US 8,842,698 B2
(45) Date of Patent: Sep. 23, 2014

(54) NAI SUBSCRIPTION-ID HINT DIGIT HANDLING

(75) Inventors: Ivy Mao, Kanata (CA); Haiqing H. Ma, Nepean (CA); Peter Wang, Ottawa (CA); Robert A. Mann, Carp (CA)

(73) Assignee: Alcatel Lucent, Boulogne-Billancourt (FR)

( * ) Notice: Subject to any disclaimer, the term of this patent is extended or adjusted under 35 U.S.C. 154(b) by 311 days.

(21) Appl. No.: 13/275,809

(22) Filed: Oct. 18, 2011

(65) Prior Publication Data

US 2013/0094521 A1 Apr. 18, 2013

(51) Int. Cl.
*H04L 12/00* (2006.01)
*H04L 29/12* (2006.01)
*H04W 8/26* (2009.01)

(52) U.S. Cl.
CPC .............. *H04L 12/00* (2013.01); *H04W 8/26* (2013.01); *H04L 61/305* (2013.01)
USPC ........................... 370/476; 370/338; 370/355

(58) Field of Classification Search
USPC .................................................. 370/476, 300
See application file for complete search history.

(56) References Cited

U.S. PATENT DOCUMENTS

| 6,775,368 B1 * | 8/2004 | Lee et al. | 379/211.02 |
| 7,286,839 B2 * | 10/2007 | McCann et al. | 455/461 |
| 2008/0020798 A1 * | 1/2008 | Jang et al. | 455/558 |

FOREIGN PATENT DOCUMENTS

| EP | 1119214 A1 | 7/2001 |
| WO | 9747146 | 12/1997 |

OTHER PUBLICATIONS

3GPP TS 23.003 V 10.0.0 3rd Generation Partnership Project: technical specification Group core network and Terminals, Dec. 2010.*
3GPP TS 23.003 V10.0.0—"3rd Generation Partnership Project Technical Specification Group Core Network and Terminals; Numbering, addressing and identification" (Release 10) Dec. 22, 2010 (Oct. 22, 2012) Retrieved From the Internet:http:www.3pp.org/ftp/Specs/html-info/23003.htm pp. 53-56.
International search report for PCT/CA2012/050734 dated Jan. 17, 2013.

* cited by examiner

*Primary Examiner* — Dang Ton
*Assistant Examiner* — Pamit Kaur
(74) *Attorney, Agent, or Firm* — Kramer Amado P.C.

(57) ABSTRACT

Various exemplary embodiments relate to a method of identifying a subscriber at a network node. The method may include: receiving a message including a network access identifier (NAI); removing the first digit from the NAI to form a stripped NAI; determining whether the stripped NAI corresponds to a subscriber; determining whether the NAI corresponds to a subscriber; adding a hint digit to form an extended NAI, and determining whether the extended NAI corresponds to a subscriber; and if any of the NAIs correspond to a subscriber, using the corresponding NAI to identify the subscriber. Various exemplary embodiments relate to a policy and charging rules node including: a subscriber cache including a subscriber identifier; an interface configured to receive a NAI; a NAI modifier configured to form an extended NAI and a stripped NAI; and a subscriber identification module configured to determine whether a NAI is stored in the subscriber cache.

18 Claims, 4 Drawing Sheets

NAI SUBSCRIPTION-ID HINT DIGIT HANDLING

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

The 3GPP has also recommended various procedures for identifying subscribers to the network. 3GPP TS 23.003 provides information on numbering, addressing and identification of the various components of a 3GPP network. A PCRF may use a variety of subscriber identification information to identify a subscriber on the network.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of identifying a subscriber at a network node. The method may include: receiving, at an interface, a message including a first network access identifier (NAI); removing the first digit from the first NAI to form a stripped NAI; determining whether the stripped NAI corresponds to a subscriber; if the stripped NAI does not correspond to a subscriber: determining whether the first NAI corresponds to a subscriber; if the first NAI does not correspond to a subscriber: adding a hint digit to the first NAI to form at least one extended NAI, and determining whether the at least one extended NAI corresponds to a subscriber; and if any of the NAIs correspond to a subscriber, using the corresponding NAI to identify the subscriber.

In various alternative embodiments the step of determining whether a NAI corresponds to a subscriber comprises searching a subscriber cache for the NAI. The method may further include querying a database with the stripped NAI, the first NAI, and the extended NAI if no NAI corresponds to a subscriber in the subscriber cache.

In various alternative embodiments, the step of adding a hint digit to the NAI includes prepending a 6 to the first NAI. In various alternative embodiments, the step of adding a hint digit to the NAI includes prepending a 0 to the first NAI.

In various alternative embodiments, the method further includes: determining whether the interface is a Gx interface; if the interface is a Gx interface, storing the first NAI in a subscriber cache as an unidentified subscriber; and if the interface is not a Gx interface, storing the stripped NAI in a subscriber cache as an unidentified subscriber.

In various alternative embodiments, the method further includes receiving, at an interface, a second message related to the unidentified subscriber including a second NAI; removing the first digit from the second NAI to form a second stripped NAI; determining whether the second stripped NAI corresponds to the unidentified subscriber; if the stripped NAI does not correspond to the unidentified subscriber: determining whether the second NAI corresponds to the unidentified subscriber; if the second NAI does not correspond to the unidentified subscriber: adding a hint digit to the second NAI to form a second extended NAI; determining whether the second extended NAI corresponds to the unidentified subscriber; and associating the second message with the unidentified subscriber if the second NAI, the second stripped NAI, or the second extended NAI corresponds to the stored NAI.

Various exemplary embodiments relate to the above described method encoded as instructions on a non-transitory machine-readable medium. The non-transitory machine-readable medium may include instructions that if executed by a processor of a network node perform the above described method.

Various exemplary embodiments relate to a policy and charging rules node (PCRN) including: a subscriber cache configured to store subscriber information including a subscriber identifier; a first interface configured to receive a message including a network access identifier (NAI); an NAI modifier configured to prepend a hint digit to the NAI to form an extended NAI and configured to strip a first digit from the NAI to form a stripped NAI; and a subscriber identification module configured to select a subscription identifier by determining whether a NAI is stored in the subscriber cache.

In various alternative embodiments, the PCRN may further include a second interface configured to query a subscription profile repository (SPR) with a set of NAIs including the NAI, the stripped NAI, and at least one extended NAI.

In various alternative embodiments, the subscriber identification module is further configured to determine whether the subscriber cache includes an NAI in the set of NAIs and query the SPR via the second interface if the subscriber cache does not include any NAI in the set of NAIs.

In various alternative embodiments, the subscriber identification module is configured to: determine whether a result set from the SPR includes a subscriber identifier; and if the result set does not include a subscriber identifier: determine whether the first interface is a Gx interface; if the first interface is a Gx interface, store the NAI as an unidentified subscriber in the subscriber cache; and if the first interface is not a Gx interface, store the stripped NAI as an unidentified subscriber in the subscriber cache.

In various alternative embodiments, the PCRN also includes a third interface configured to receive a second message including a second NAI, wherein the NAI modifier is further configured to generate a second stripped NAI and a second extended NAI; and the subscriber identification module is further configured to compare the second stripped NAI, second NAI, and second extended NAI to the NAI stored for the unidentified subscriber.

In various alternative embodiments, the NAI modifier forms a first extended NAI by prepending a 0 to the NAI and forms a second extended NAI by prepending a 6 to the NAI.

It should be apparent that, in this manner, various exemplary embodiments enable a policy and charging rules node and a method for identifying a subscriber. In particular, by using alternative NAIs, a subscriber may be identified even when network nodes use different NAIs to identify the same subscriber.

BRIEF DESCRIPTION OF THE DRAWINGS

In order to better understand various exemplary embodiments, reference is made to the accompanying drawings, wherein.

DETAILED DESCRIPTION

A policy and rules charging node may receive messages from a plurality of network nodes. Although the 3GPP standards describe a format for a network access identifier (NAI), they allow variation of the NAI in various contexts. In particular, under the Proxy Mobile IP (PMIPv6) standard, an NAI received via a Gx interface may not include a hint digit, whereas under the GPRS Tunneling Protocol (GTP), an NAI received via a Gx interface may include a hint digit. Other interfaces may include a hint digit in messages sent to the PCRN. Because a mobile user may move between cells of the network, the user may be handed off to a network node that uses a different NAI format. If a PCRN does not recognize a variation of the NAI, it may end up discarding a message rather than correctly processing the message. The 3GPP specifications also indicate that an establish message received on the Gx interface should follow an establish message received via another interface. However, a PCRN may process the Gx message before receiving an establish message via another interface.

Additionally, a service provider may wish to provide service to an unprovisioned subscriber associated with the network. Accordingly, if the PCRN cannot immediately identify a subscriber, it may create an unidentified subscriber record and provide the unidentified subscriber with service before the subscriber is identified.

Referring now to the drawings, in which like numerals refer to like components or steps, there are disclosed broad aspects of various exemplary embodiments.

Figure 1:
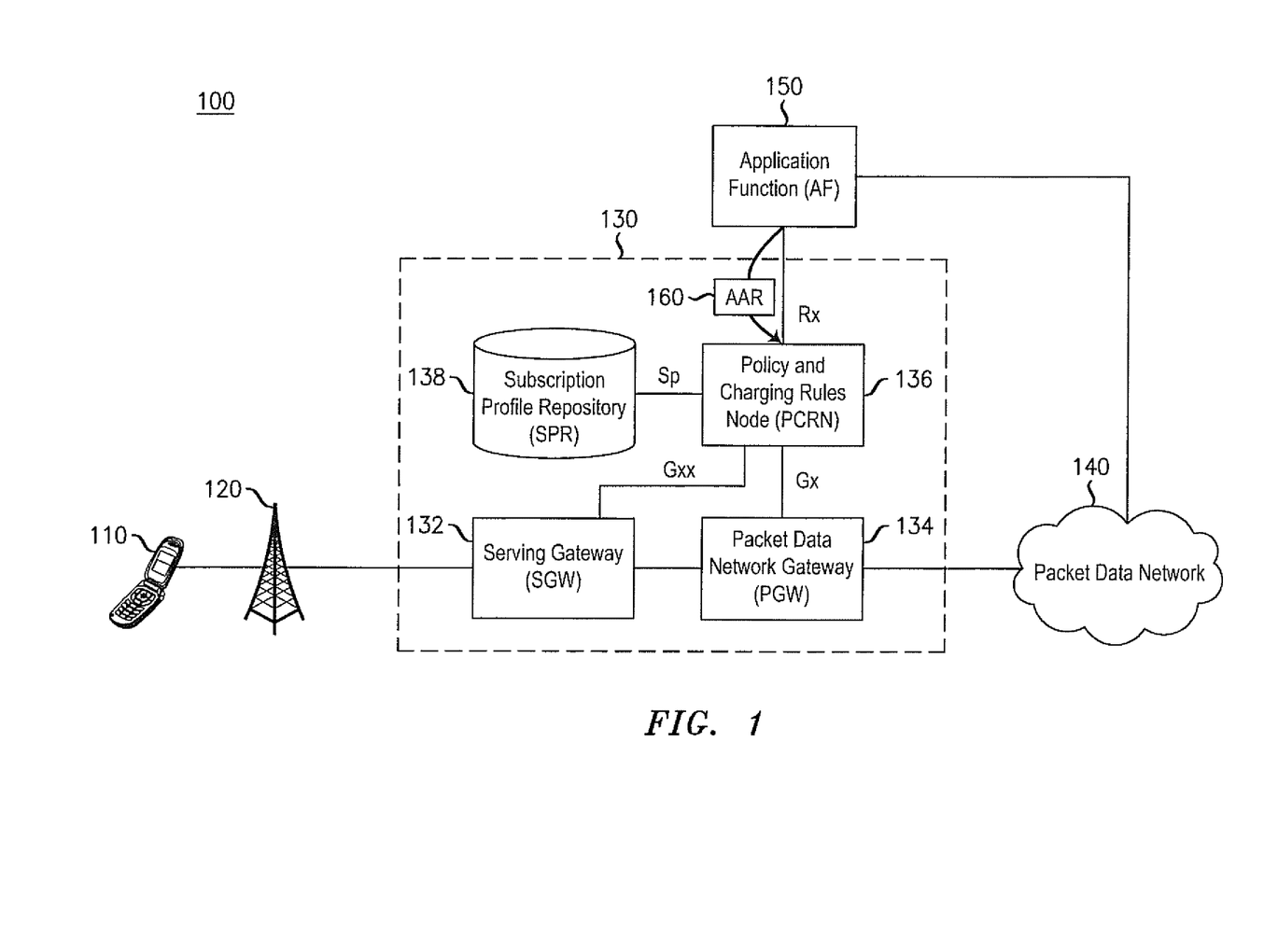
FIG. 1 illustrates an exemplary subscriber network.

FIG. 1 illustrates an exemplary subscriber network 100 for providing various data services. Exemplary subscriber network 100 may be telecommunications network or other network for providing access to various services. Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the PMIPv6 standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. PCRN 136 may receive an application request in the form of an Authentication and Authorization Request (AAR) 160 from AF 150. AAR 160 may include information such as, for example, a network access identifier (NAI) for identifying a subscriber associated with the request. An NAI included in an AAR message received via the Rx interface of PCRN 136 may include a hint digit as the leading digit of the NAI. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. An NAI included in a CCR message may vary based on the implementation of the PGW 134. In particular, if PGW 134 implements the PMIPv6 standard, the NAI may not include a hint digit. If PGW 134 implements the GTP standard, the NAI may include a hint digit as the leading digit of the NAI. As with AAR 160, upon receipt of a CCR, PCRN may generate at least one new PCC rule for fulfilling the application request 170. In various embodiments, AAR 160 and the CCR may represent two independent application requests to be processed separately, while in other embodiments, AAR 160 and the CCR may carry information regarding a single application request and PCRN 136 may create at least one PCC rule based on the combination of AAR 160 and the CCR. PCRN 136 may match an AAR and CCR based upon matching subscriber identifiers. In various embodiments, PCRN 136 may be capable of handling both single-message and paired-message application requests.

PCRN 136 may also be in communication with a partner device such as a PCRN of one or more other service providers via an S9 interface (not shown). PCRN 136 may receive forwarded AAR or CCR messages from a partner device servicing a roaming subscriber attached to the network of the partner device. PCRN 136 may generate at least one PCC rule for the roaming subscriber in response to such requests. When PCRN 136 receives a request related to a subscriber of another service provider, it may forward the request to the partner device of the other service provider via the S9 interface and receive a response including a PCC rule.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber such as an NAI, for example, and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) 160 according to the Diameter protocol, to notify the PCRN 136 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 150 may communicate such an application request to the PCRN 136 via the Rx interface.

Figure 2:
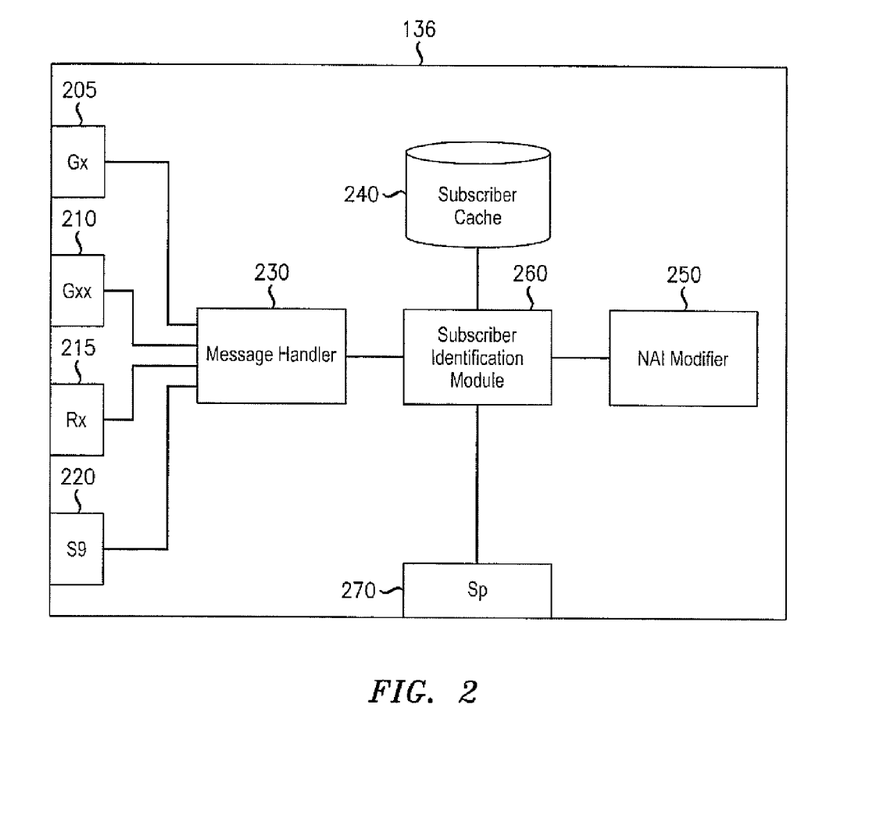
FIG. 2 illustrates an exemplary policy and charging rules node (PCRN)

FIG. 2 illustrates an exemplary policy and charging rules node (PCRN) 136. PCRN 136 may include Gx interface 205, Gxx interface 210, Rx interface 215, S9 interface 220, message handler 230, subscriber cache 240, NAI modifier 250, subscriber identification module 260, and Sp interface 270.

Gx interface 205 may be an interface comprising hardware and/or executable instructions encoded on a machine-readable storage medium configured to communicate with a PGW such as PGW 134. Such communication may be implemented according to the 3GPP TS 29.212. Thus, Gx interface 410 may receive requests for PCC rules and transmit PCC rules for installation. Gx interface 205 may further receive UE-originated application requests, session requests, and event notifications in the form of a CCR. A CCR message received via the Gx interface may include a Subscription-ID AVP or a Mobile Node Identifier using NAI. The format of the NAI may follow 3GPP TS 23.003. If the PGW 132 follows the GTP standard, the identifier may include a leading hint digit. The hint digit may vary between devices and may be a 0 or a 6. If the PGW 132 follows the PMIPv6 standard, the identifier may not include a leading hint digit.

Gxx interface 210 may be an interface comprising hardware and/or executable instructions encoded on a machine-readable storage medium configured to communicate with a SGW such as SGW 132. Such communication may be implemented according to the 3GPP TS 29.212. Thus, Gxx interface 210 may receive requests for QoS rules and transmit QoS rules for installation. Gxx interface 210 may further receive UE-originated application requests, session requests, and event notifications in the form of a credit control request (CCR). Messages received via the Gxx interface may include a leading hint digit in an NAI.

Rx interface 215 may be an interface comprising hardware and/or executable instructions encoded on a machine-readable storage medium configured to communicate with an AF such as AF 150. Such communication may be implemented according to the 3GPP TS 29.214. Thus, Rx interface 210 may receive requests for services for a subscriber from an application function. Messages received via the Rx interface may include a leading hint digit in an NAI.

S9 interface 220 may be an interface comprising hardware and/or executable instructions encoded on a machine-readable storage medium configured to communicate with a partner device of another service provider. Such communication may be implemented according to the 3GPP TS 29.215. S9 interface 220 may receive messages forwarded by the partner device. The messages may follow the format received at the partner device. Therefore, an NAI included in a message received via the S9 interface may or may not include a leading hint digit.

Message handler 230 may include hardware and/or executable instructions on a machine-readable storage medium configured to process messages sent and/or received via Gx interface 205, Gx interface 210, Rx interface 215, and/or S9 interface 220. Message handler 230 may process received messages by extracting various fields or AVPs from the message. For example, message handler 230 may extract an NAI from the Subscription-ID AVP or Mobile Node Identifier field of a message. Message handler 230 may also construct messages to send to other network nodes.

Subscriber cache 240 may be a device that stores information related to subscribers to the subscriber network 100. Thus, subscriber cache 240 may include a machine-readable storage medium such as random-access memory (RAM), magnetic disk storage media, optical storage media, flash-memory devices, and/or similar storage media. Subscriber cache 240 may include a subset of the information stored in SPR 138. Subscriber cache 240 may be arranged to provide quick access to frequently used subscriber information such as, for example, information of subscribers who are currently using network 100. Data stored by subscriber cache 240 may include a subscriber identifier of each subscriber and indications of subscription information for each subscriber such as bandwidth limits, charging parameters, and subscriber priority. The subscriber identifier for a known subscriber provisioned by a network operator may be an NAI that does not include a hint digit. The subscriber identifier for an unidentified subscriber may be an NAI or an alternative NAI that was received in a first message associated with the subscriber. Subscriber cache 240 may also include information for unidentified subscribers such as an unmatched identifier received in a message.

NAI modifier 250 may include hardware and/or executable instructions on a machine-readable storage medium configured to generate alternative NAIs. NAI modifier 250 may generate a stripped NAI by removing the leading digit of a NAI portion. NAI modifier 250 may generate an extended NAI by prepending a hint digit to a NAI portion. In various exemplary embodiments, NAI modifier may use 0 or 6 as a hint digit. NAI modifier 250 may generate multiple alternative NAIs for a NAI portion.

Subscriber identification module 260 may include hardware and/or executable instructions on a machine-readable storage medium configured to determine whether a NAI matches a stored subscriber identifier. Subscriber identification module 260 may search the records stored in subscriber cache 240 to determine whether a NAI matches a subscriber identifier of a subscriber record. If the subscriber identification module 260 finds a matching record, the subscriber identifier of the record may be used to identify the subscriber, and the information in the subscriber record may be used by PCRN 136 for making policy decisions. Subscriber identification module 260 may also query SPR 138 via Sp interface 270. A query to SPR 138 may be slower than searching the subscriber cache 240. Subscriber identification module 260 may query SPR 138 using a set of alternative NAIs.

Sp interface 270 may be an interface comprising hardware and/or executable instructions encoded on a machine-readable storage medium configured to communicate with an SPR such as SPR 138. Sp interface 270 may receive a set of NAIs or other subscriber identifiers and form a query to SPR 270. In various exemplary embodiments, Sp interface 270 may be a network interface and communicate with a remote SPR. In various alternative embodiments, the SPR may be a local database within PCRN 136, and Sp interface 270 may query the local database. In either case, Sp interface 270 may receive a result set including any subscriber records matching the NAIs and/or subscriber identifiers included in the query. In various alternative embodiments, an LDAP interface may be used to communicate with SPR 138 in place of Sp interface 270.

Figure 3:
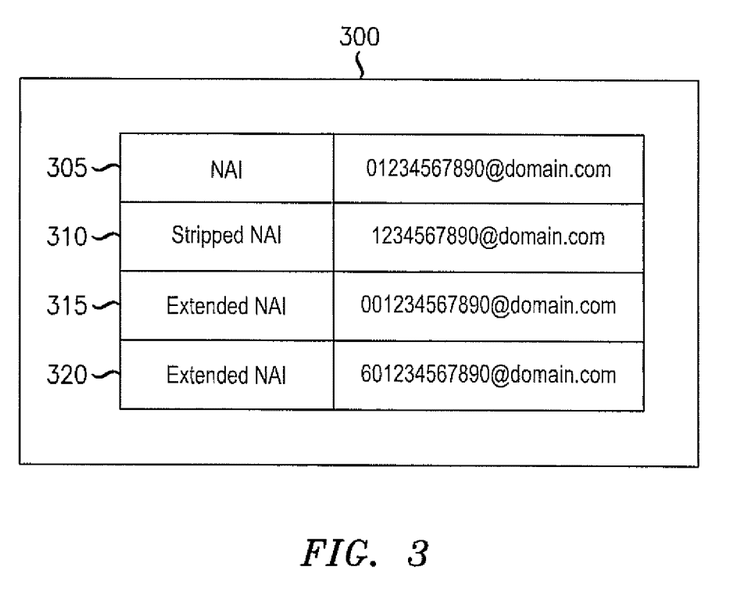
FIG. 3 illustrates an exemplary data structure showing alternative forms of a NAI.

FIG. 3 illustrates an exemplary data structure 300 showing alternative forms of a NAI. Data structure 300 may be used by, for example, subscriber identification module 260 for querying SPR 138 with a set of alternative NAIs. Data structure 300 may include NAI 300, stripped NAI 310, extended NAI 315, and extended NAI 320.

NAI 305 may include an NAI as it is received in a message at PCRN 136. NAI 136 may include two portions, a username and a domain name. The username may uniquely identify a subscriber of network 100. The domain name may be the same for all subscribers of network 100, or may vary. As an example, NAI 305 is shown as "01234567890@domain.com". As described above, the first digit of NAI 305 may be a hint digit. PCRN 136, however, may not be able to determine from a single message whether NAI 300 includes a hint digit. For example, the leading 0 of NAI 305 may be a hint digit or the first digit of the subscriber identifier.

Stripped NAI 310 may be a received NAI that has been modified by removing the leading digit. If the leading digit was a hint digit, stripped NAI 310 may be the subscriber identifier. If the received NAI did not include a hint digit, stripped NAI 310 may be an incomplete subscriber identifier. Multiple subscriber identifiers may include the incomplete subscriber identifier. Continuing the above example of NAI 305, stripped NAI 310 is shown as "1234567890@domain.com".

Extended NAI 315 may be a received NAI that has been modified by prepending a hint digit at the front such that the hint digit is the leading digit of the extended NAI 315. The hint digit may be a 0. Extended NAI 315 may have been stored in subscriber cache 260, for example, if PCRN 136 received a message via the Gx interface and was unable to identify the subscriber. Continuing the above example of NAI 305, extended NAI 315 is shown as "001234567890@domain.com".

Extended NAI 320 may be a received NAI that has been modified by prepending a hint digit at the front such that the hint digit is the leading digit of the extended NAI 320. The hint digit may be a 6. Extended NAI 320 may have been stored in subscriber cache 260, for example, if PCRN 136 received a message via the Gx interface and was unable to identify the subscriber. Continuing the above example of NAI 305, extended NAI 320 is shown as "601234567890@domain.com".

Figure 4:
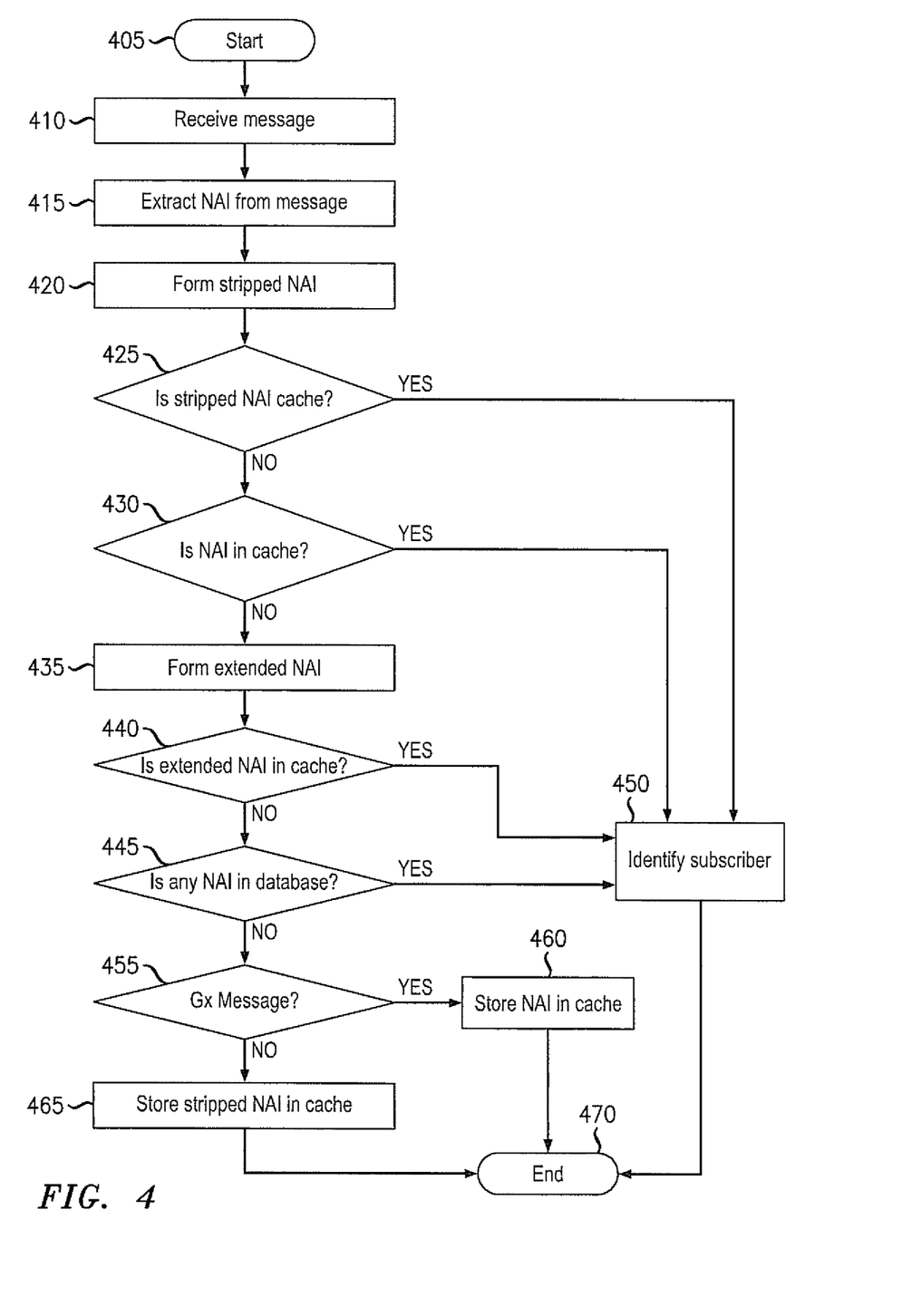
FIG. 4 illustrates a flowchart showing an exemplary method of identifying a subscriber.

FIG. 4 illustrates a flowchart showing an exemplary method 400 of identifying a subscriber. Method 400 may be performed by the various components of PCRN 136 including message handler 230, NAI modifier 250, and subscriber identification module 260.

Method 400 may begin at step 405 and proceed to step 410, where PCRN 136 may receive a message. The message may arrive via any one of Gx interface 205, Gxx interface 210, Rx interface 215, or S9 interface 220. PCRN 136 may be able to determine via which interface the message arrived. If the message arrived via the Gx interface, PCRN 136 may not be able to determine whether the PGW 134 uses the GTP standard or the PMIPv6 standard. In step 415, PCRN 136 may extract a NAI from the received message. The NAI may be present in a Subscription-ID AVP of the received message. The method 400 may then proceed to step 420.

In step 420, PCRN 136 may form a stripped NAI by removing the leading digit from the NAI. PCRN 136 may remove the leading digit regardless of whether the first digit is known as a hint digit. The method 400 may then proceed to step 425, where PCRN 136 may determine whether the stripped NAI matches a subscriber identifier in subscriber cache 240. If the stripped NAI matches a subscriber identifier in subscriber cache 240, the method 400 may proceed to step 450. If the stripped NAI does not match any subscriber identifier in subscriber cache 240, the method 400 may proceed to step 430.

In step 430, PCRN 136 may determine whether the received NAI matches a subscriber identifier in subscriber cache 240. If the received NAI matches a subscriber identifier in subscriber cache 240, the method 400 may proceed to step 450. If the received NAI does not match any subscriber identifier in subscriber cache 240, the method 400 may proceed to step 435.

In step 435, PCRN 136 may form an extended NAI by prepending a hint digit to the received NAI. PCRN 136 may add any hint digit known to be used within a NAI. PCRN 136 may form multiple extended NAIs if more than one hint digit is known to be used within a NAI. For example, PCRN 136 may form a first extended NAI by prepending a 0 and form a second extended NAI by prepending a 6. The method 400 may then proceed to step 440, where PCRN 136 may determine whether the extended NAI matches a subscriber identifier in subscriber cache 240. If the extended NAI matches a subscriber identifier in subscriber cache 240, the method 400 may proceed to step 450. If the extended NAI does not match any subscriber identifier in subscriber cache 240, the method 400 may proceed to step 445.

In step 445, PCRN 136 may determine whether any of the NAIs, including the received NAI, the stripped NAI, and any extended NAI matches a record in SPR 138. PCRN 136 may use data arrangement 300 to store a set of NAIs. PCRN 136 may then query SPR 138 with data arrangement 300 via Sp interface 270. PCRN 136 may receive a result set that may include a subscriber record if a matching NAI is found. The method may proceed too step 450 if a matching NAI is included in the result set. If there are no subscriber records in the result set, the method may proceed to step 455.

In step 450, PCRN 136 may determine that the matching subscriber record corresponds to the received message. PCRN 136 use information in the subscriber record and information contained in the message to generate a policy decision. For example, PCRN 136 may generate PCC rules based on the message and subscriber record. The method may then proceed to step 470 where the method ends.

In step 455, PCRN 136 may determine whether to store an NAI as an unidentified subscriber based on the interface via which the message was received. If the message was received via Gx interface 205, the method 400 may proceed to step 460. PCRN 136 may also determine that the message was received via a Gx interface if the message was received via the S9 interface, but the partner device that forwarded the message received the message via a Gx interface. If the message was received via another interface such as Gxx interface 210, Rx interface 215 or S9 interface 220, the method 400 may proceed to step 465.

In step 460, PCRN 136 may store the NAI as a subscriber identifier for an unidentified subscriber. The record for the unidentified subscriber may include the NAI and any other information included in the message. In various exemplary embodiments, PCRN 136 may make a policy decision and fulfill the message request using default subscriber information. PCRN 136 may provide the UE 110 associated with the message with service despite being unable to identify the subscriber. In various alternative embodiments, PCRN 136 may wait for an additional message that provides more information about the unidentified subscriber. Because the stored NAI was received via the Gx interface, it may be an actual NAI, or it may be an extended NAI including a hint digit. In either case, PCRN 136 may be able to associate a second message with the unidentified subscriber using method 400 even if an alternative NAI is used in the second message.

In step 465, PCRN 136 may store the stripped NAI as a subscriber identifier for an unidentified subscriber. The record for the unidentified subscriber may include the stripped NAI and any other information included in the message. In various exemplary embodiments, PCRN 136 may make a policy decision and fulfill the message request using default subscriber information. PCRN 136 may provide the UE 110 associated with the message with service despite being unable to identify the subscriber. In various alternative embodiments, PCRN 136 may wait for an additional message that provides more information about the unidentified subscriber. Because the NAI was not received via the Gx interface, the received NAI may be an extended NAI including a hint digit. Therefore, the stripped NAI may be the actual NAI, and PCRN 136 may be able to associate a second message with the unidentified subscriber using method 400 even if an alternative NAI is used in the second message.

Having described a PCRN and method performed by the PCRN, several examples of identifying a subscriber will now be provided. For convenience, the description will refer to the alternative forms of the NAI shown in FIG. 3. The SPR 138 and subscriber cache 240 may be provisioned with an NAI without any hint digit. Therefore, SPR 138 and subscriber cache 240 may include NAI 305 as the subscriber identifier for a subscriber to the local network named Alice, who in this example, may initially be the only subscriber in SPR 138 and subscriber cache 240.

In a first example, PCRN 136 may receive a message such as an AAR via the Rx interface. The exemplary NAI within the AAR includes a hint digit and is therefore an extended NAI such as extended NAI 315 and extended NAI 320. When PCRN strips the first digit from, for example, extended NAI 315 the stripped NAI matches NAI 305. Therefore, PCRN 136 may identify subscriber Alice as the subscriber associated with the message. In a network where most PGWs use GTP, this type of identification may be common and may be performed quickly.

In a second example, PCRN 136 may receive a message such as a CCR via the Gx interface. It would be unknown whether the exemplary NAI within the CCR includes a hint digit. Therefore, the received NAI may be NAI 305, extended NAI 315, or extended NAI 320. If the received NAI is an extended NAI, this example would be similar to the first example. If the received NAI is NAI 305, PCRN 136 would strip the first digit and check to see if stripped NAI 310 is in the subscriber cache. When NAI 310 is not found, PCRN 136 would then check NAI 305 and identify Alice.

In a third example, PCRN may receive a CCR message via the Gx interface that includes the NAI "669876543210@domain.com". PCRN 136 may not know whether this NAI includes a hint digit, but in this example it does. PCRN 136 would check a stripped NAI, received NAI, and extended NAI, but none would match Alice. PCRN 136 may also query SPR 138 with the set of NAIs, but not receive a match. However, PCRN 136 may wish to provide the requested service because the NAI indicates that the subscriber, like Alice, subscribes to domain.com. Therefore, PCRN 136 may create an unidentified subscriber and store the NAI "669876543210@domain.com" as the subscriber identifier.

If PCRN 136 receives a second message associated with the unidentified subscriber, for example, an AAR message via the Rx interface, the message would include the NAI "669876543210@domain.com". PCRN 136 would first check the stripped NAI, which would not match. PCRN 136 would then check the received NAI, which would match. Therefore, PCRN 136 would be able to match the second message with the unidentified subscriber and the first message.

If PCRN 136 were to receive a third message associated with the unidentified subscriber, for example, a CCR message via the Gx interface from a PGW implementing PMIPv6, the message would include the NAI "69876543210@domain.com". The subscriber may have been handed over to the new PGW which uses the different NAI. PCRN 136 would first check the stripped NAI, which would not match. PCRN 136 would then check the received NAI, which would not match. Finally, PCRN 136 would form an extended NAI by prepending a 6 to the received NAI, which would match the record for the unidentified subscriber. Therefore, PCRN 136 would be able to match the third message with the unidentified subscriber and the first message. Thus, PCRN 136 may identify a subscriber regardless of whether other network nodes use a hint digit.

According to the foregoing, various exemplary embodiments provide for a policy and charging rules node and method for identifying a subscriber. In particular, by using alternative NAIs, a subscriber may be identified even when network nodes use different NAIs to identify the same subscriber.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of identifying a subscriber at a network node, the method comprising:
   receiving, at an interface, a message including a first network access identifier (NAI);
   removing the first digit from the first NAI to form a stripped NAI;
   determining whether the stripped NAI corresponds to a subscriber;
   if the stripped NAI does not correspond to a subscriber:
      determining whether the first NAI corresponds to a subscriber;
      if the first NAI does not correspond to a subscriber:
         adding a hint digit to the first NAI to form at least one extended NAI, and
         determining whether the at least one extended NAI corresponds to a subscriber; and
   if any of the NAIs correspond to a subscriber, using the corresponding NAI to identify the subscriber.

2. The method of claim 1, wherein the step of determining whether a NAI corresponds to a subscriber comprises searching a subscriber cache for the NAI.

3. The method of claim 2, further comprising querying a database with the stripped NAI, the first NAI, and the extended NAI if no NAI corresponds to a subscriber in the subscriber cache.

4. The method of claim 1, wherein the step of adding a hint digit to the NAI comprises prepending a 6 to the first NAI.

5. The method of claim 1, wherein the step of adding a hint digit to the NAI comprises prepending a 0 to the first NAI.

6. The method of claim 1, further comprising:
   determining whether the interface is a Gx interface;
   if the interface is a Gx interface, storing the first NAI in a subscriber cache as an unidentified subscriber; and
   if the interface is not a Gx interface, storing the stripped NAI in a subscriber cache as an unidentified subscriber.

7. The method of claim 6, further comprising:
   receiving, at an interface, a second message related to the unidentified subscriber including a second NAI;
   removing the first digit from the second NAI to form a second stripped NAI;
   determining whether the second stripped NAI corresponds to the unidentified subscriber;
   if the stripped NAI does not correspond to the unidentified subscriber:
      determining whether the second NAI corresponds to the unidentified subscriber;
      if the second NAI does not correspond to the unidentified subscriber:
         adding a hint digit to the second NAI to form a second extended NAI;
         determining whether the second extended NAI corresponds to the unidentified subscriber; and
      associating the second message with the unidentified subscriber if the second NAI, the second stripped NAI, or the second extended NAI corresponds to the stored NAI.

8. A policy and charging rules node (PCRN) comprising:
a subscriber cache configured to store subscriber information including a subscriber identifier;a first interface configured to receive a message including a network access identifier (NAI);an NAI modifier configured to prepend a hint digit to the NAI to form an extended NAI and configured to strip a first digit from the NAI to form a stripped NAI; and a subscriber identification module configured to select a subscription identifier by determining whether a NAI is stored in the subscriber cache;
a second interface configured to query a subscription profile repository (SPR) with a set of NAIs including the NAI, the stripped NAI, and at least one extended NAI;
wherein the subscriber identification module is further configured to determine whether the subscriber cache includes an NAI in the set of NAIs and query the SPR via the second interface if the subscriber cache does not include any NAI in the set of NAIs.

9. The PCRN of claim 8, wherein the subscriber identification module is configured to:
determine whether a result set from the SPR includes a subscriber identifier; and
if the result set does not include a subscriber identifier:
determine whether the first interface is a Gx interface;
if the first interface is a Gx interface, store the NAI as an unidentified subscriber in the subscriber cache; and
if the first interface is not a Gx interface, store the stripped NAI as an unidentified subscriber in the subscriber cache.

10. The PCRN of claim 9, further comprising a third interface configured to receive a second message including a second NAI, wherein the NAI modifier is further configured to generate a second stripped NAI and a second extended NAI; and the subscriber identification module is further configured to compare the second stripped NAI, second NAI, and second extended NAI to the NAI stored for the unidentified subscriber.

11. The PCRN of claim 8, wherein the NAI modifier forms a first extended NAI by prepending a 0 to the NAI and forms a second extended NAI by prepending a 6 to the NAI.

12. A tangible and non-transitory machine-readable storage medium encoded with instructions thereon for execution by a network element of a telecommunication network, wherein said tangible and non-transitory machine-readable storage medium comprises:
instructions for receiving, at an interface, a message including a first network access identifier (NAI);
instructions for removing the first digit from the first NAI to form a stripped NAI;
instructions for determining whether the stripped NAI corresponds to a subscriber;
instructions for determining whether the first NAI corresponds to a subscriber if the stripped NAI does not correspond to a subscriber;
instructions for adding a hint digit to the first NAI to form at least one extended NAI, and instructions for determining whether the at least one extended NAI corresponds to a subscriber if the first NAI does not correspond to a subscriber; and
instructions for using the corresponding NAI to identify the subscriber if any of the NAIs correspond to a subscriber.

13. The tangible and non-transitory machine-readable storage medium of claim 12, wherein the instructions for determining whether a NAI corresponds to a subscriber comprise instructions for searching a subscriber cache for the NAI.

14. The tangible and non-transitory machine-readable storage medium of claim 13, further comprising instructions for querying a database with the stripped NAI, the first NAI, and the extended NAI if no NAI corresponds to a subscriber in the subscriber cache.

15. The tangible and non-transitory machine-readable storage medium of claim 12, wherein the instructions for adding a hint digit to the NAI comprise instructions for prepending a 6 to the first NAI.

16. The tangible and non-transitory machine-readable storage medium of claim 12, wherein the instructions for adding a hint digit to the NAI comprise instructions for prepending a 0 to the first NAI.

17. The tangible and non-transitory machine-readable storage medium of claim 12, further comprising:
instructions for determining whether the interface is a Gx interface;
instructions for storing the NAI in a subscriber cache as an unidentified subscriber if the interface is a Gx interface; and
instructions for storing the stripped NAI in a subscriber cache as an unidentified subscriber if the interface is not a Gx interface.

18. The tangible and non-transitory machine-readable storage medium of claim 17, further comprising:
instructions for receiving, at an interface, a second message related to the unidentified subscriber including a second NAI;
instructions for removing the first digit from the second NAI to form a second stripped NAI;
instructions for determining whether the second stripped NAI corresponds to the unidentified subscriber;
instructions for determining whether the second NAI corresponds to the unidentified subscriber if the stripped NAI does not correspond to the unidentified subscriber;
instructions for adding a hint digit to the second NAI to form a second extended NAI and instructions for determining whether the second extended NAI corresponds to the unidentified subscriber if the second NAI does not correspond to the unidentified subscriber; and
instructions for associating the second message with the unidentified subscriber if the second NAI, the second stripped NAI, or the second extended NAI corresponds to the stored NAI.

* * * * *